Patented Jan. 14, 1936

2,027,658

UNITED STATES PATENT OFFICE 2,027,658

DYESTUFFS OF THE ANTHRAQUINONE SERIES

Klaus Weinand and Ernst Kalckbrenner, Leverkusen I. G.-Werk, Germany, assignors to General Aniline Works, Inc., New York, N. Y., a corporation of Delaware No Drawing. Application October 12, 1933, Serial No. 693,393. In Germany October 21, 1932

5 Claims. (Cl. 260—60)

The present invention relates to new dyestuffs of the anthraquinone series, more particularly it relates to dyestuffs of the probable general formula:

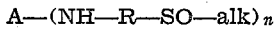

A—(NH—R—SO—alk)$_n$ wherein A stands for a radical of the anthraquinone series, R stands for a radical of the benzene series, alk stands for an alkyl group and $n$ stands for one of the numbers one and two, and wherein at least one sulfonic acid group is present in the molecule.

Our new dyestuffs are obtainable according to various methods. Thus, for example, there may be first prepared anthraquinone sulfonic acids containing one or two substituents which can be replaced by radicals of amines, such as halogen atoms or hydroxy groups. These substituted anthraquinone sulfonic acids are then caused to react with an amine of the general formula: NH$_2$—R—SO—alkyl, wherein R means a radical of the benzene series, according to methods known per se, or the said substituted anthraquinone sulfonic acids are condensed with an amine of the general formula: NH$_2$—R—S—alkyl, R meaning a radical of the benzene series, in which case an oxidation of the sulfide to the sulfoxide must be carried out; this oxidation can be performed either simultaneously with the condensation process or afterwards in a separate step.

Another method of preparing our new dyestuffs resides in first replacing in anthraquinone compounds free from a sulfonic acid group, but bearing at least one substituent which can be replaced by a radical of an amine, the said substituent or substituents by the group

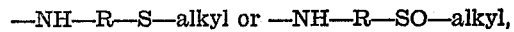

—NH—R—S—alkyl or —NH—R—SO—alkyl, and then introducing into the molecule the sulfonic acid group or groups; in case of the sulfide the oxidation to the sulfoxide is performed simultaneously with the sulfonation process or afterwards in a separate step.

The introduction of the sulfonic acid group can be performed with the aid of one of the usual sulfonating agents, such as oleum, or by substituting halogen present in the molecule by the sulfonic acid group by the action of neutral alkali metal sulfite. The latter process is especially valuable for the manufacture of compounds of the general formula:

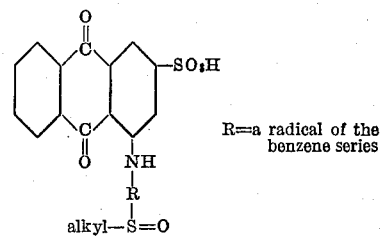

R=a radical of the benzene series it being immaterial whether the sulfoxide group is formed prior to the introduction of the sulfonic acid group or afterwards. Thus, for example, the following reactions may be performed:

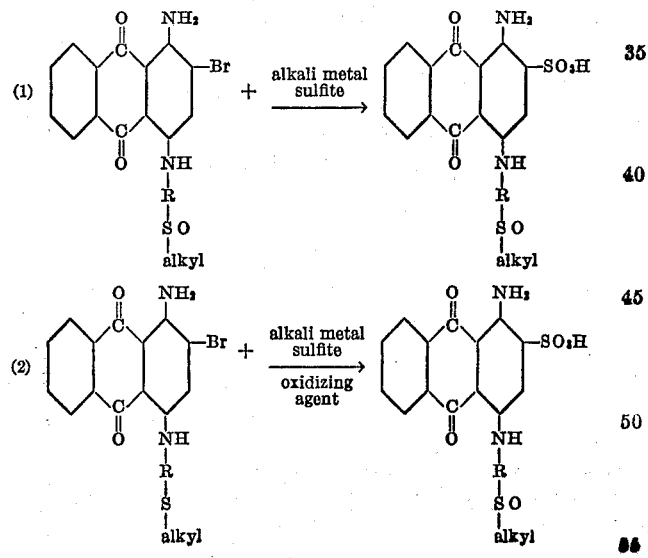

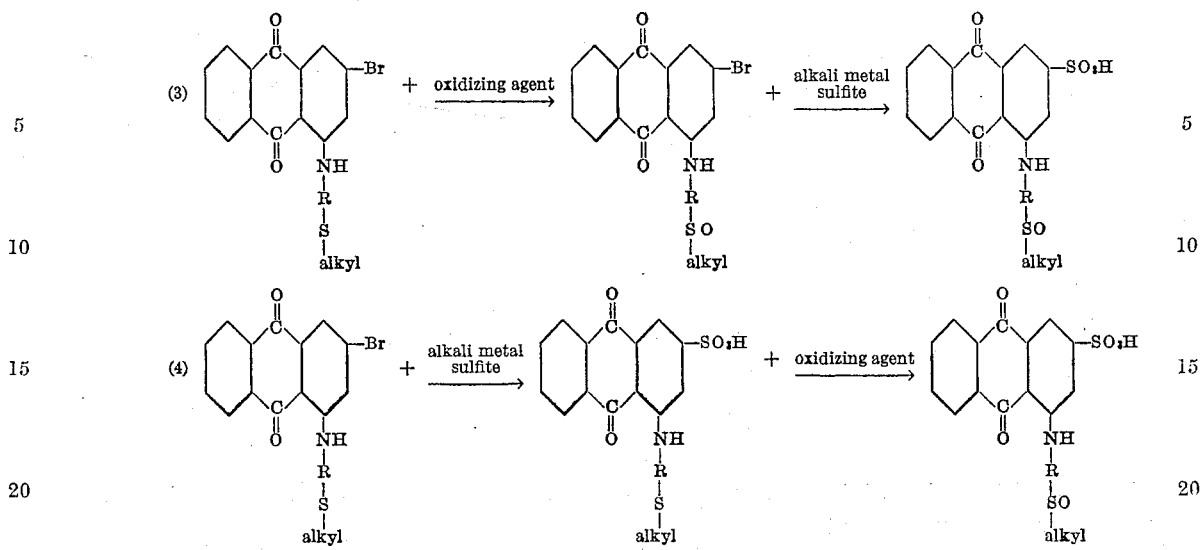

The oxidation of the sulfide group to the sulfoxide group in the compounds free from sulfonic acid groups can be performed, for example, with hydrogen peroxide or lead tetracetate in the presence of an organic solvent, such as glacial acetic acid, while in the case of compounds containing sulfonic acid groups there is favorably used water as solvent or diluent and hydrogen peroxide as oxidizing agent.

The new compounds are in form of their alkali metal salts generally crystalline, dark metallic lustrous powders, easily soluble in water. They are generally valuable dyestuffs for wool, dyeing wool from an acid bath generally bluish to green shades. Compared with analogously constituted anthraquinone amino condensation products they are distinquished by an improved solubility in water and capability of egalizing.

The invention is illustrated by the following examples, without being limited thereto:

*Example 1*

| | Parts by weight |
|---|---|
| 1-amino-4-bromoanthraquinone-2-sulfonic acid | 10 |
| 4-aminophenyl-methylsulfoxide | 10 |
| Sodium bicarbonate | 12 |
| Cuprous chloride | 0.5 | are introduced into 150 parts by weight of water and heated at a temperature of about 70 to about 100° C. until a clear blue solution has formed. The dyestuff formed having in its free state the following formula:

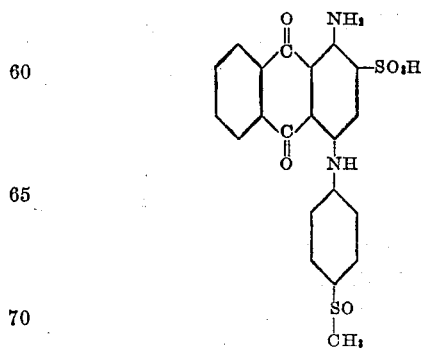

is separated as potassium salt in a crystalline form by the addition of potassium chloride. It dyes wool from an acid bath even blue shades.

By substituting the 4-aminophenylmethylsulfoxide by 4-methyl-3-aminophenylmethylsulfoxide or by 4-aminodiphenylsulfoxide or by 4-aminophenylethylsulfoxide there are obtained dyestuffs exerting similar properties.

*Example 2.*—20 parts by weight of 1-amino-2,4-dibromoanthraquinone are heated in 200 parts by weight of 4-aminophenylmethylsulfide for about 8 to 10 hours at about 170–190° C. with the addition of 10 parts by weight of sodium acetate, whereby the brown coloration of the solution turns to greenish-blue. By the addition of alcohol the 1-amino-2-bromo-4-(4'-methylmercapto)anilidoanthraquinone separates in a crystalline form.

10 parts by weight of the condensation product thus obtained are heated with 10 parts by weight of sodium sulfite in 100 parts by weight of water and with the addition of 20 parts by weight of phenol/pyridine or 30–50 parts by weight of alcohol at 130–140° C. until the condensation product has entered into solution. The greenish-blue solution formed is treated at 60–70° C. with about 5–10 parts by weight of an aqueous hydrogen-peroxide solution of 30% strength, whereby the coloration of the greenish-blue solution is turned to red. The dyestuff formed is identical with that described in Example 1.

The condensation product obtained from 1-amino-2,4-dibromoanthraquinone and 4-aminophenylmethylsulfide obtained in accordance with paragraph 1 can be oxidized in glacial acetic acid or pyridine with hydrogenperoxide or lead tetracetate prior to the exchange of the 2-bromo-atom with sulfite to a compound of the following constitution:

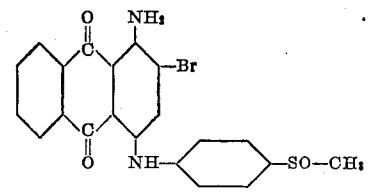

and then treated with sulfite in the manner described.

*Example 3.*—10 parts by weight of leuco-quinizarine-6-sulfonic acid and 40 parts by weight of 4-methyl-3-aminophenylmethylsulfoxide are heated in 100 parts by weight of glacial acetic acid for a short time at 90–120° C. with the addition of 10 parts by weight of crystallized boric acid. After cooling, the melt is stirred into about 200 parts by weight of an aqueous caustic soda lye of 30% strength, whereby the dyestuff formed separates in green crystals. The same are filtered and purified by recrystallizing from water. The dyestuff having in the free state the following formula:

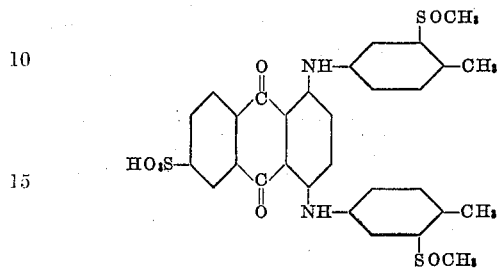

is soluble in water with a green coloration and dyes wool from an acid bath green even shades.

Example 4.—20 parts by weight of quinizarin-6-sulfonic acid are introduced into 100 parts by weight of 4-aminophenylmethylsulfide, and at 60–70° C. 10 parts by weight of an aqueous hydrochloric acid of 20% strength are added. At this temperature part of the quinizarin-6-sulfonic acid is reduced by slowly adding 2 parts by weight of zinc dust. After this 5 parts by weight of boric acid are added, the temperature is raised to 100–110° C. and kept at this temperature until a test portion is soluble in pyridine-water with a yellowish-green coloration.

To the melt alcohol is added and the condensation product formed having the following constitution:

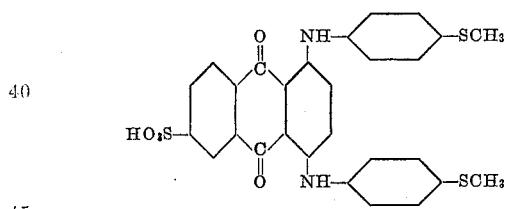

is sucked off.

10 parts by weight of this product are treated in water with 5–10 parts by weight of hydrogenperoxide with the addition of sodium acetate at elevated temperature, until the product completely has entered into solution. By the addition of common salt the dyestuff of the following formula:

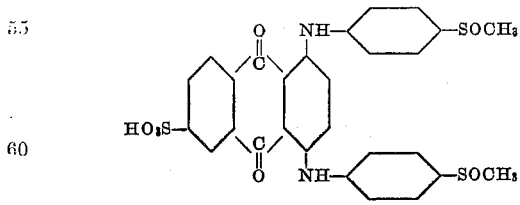

separates. It is identical with the product which is obtained when performing the condensation of the quinizarin-6-sulfonic acid with 4-aminophenylmethylsulfoxide in a manner as is described in Example 3. It has properties similar to those of the dyestuff described in Example 3.

Example 5.—6 parts by weight of quinizarin and 4 parts by weight of leucoquinizarin are heated with the addition of 5 parts by weight of boric acid in 60 parts by weight of 4-aminophenylmethylsulfide at 96–100° C. until a test portion gives a clear green solution in pyridine.

The melt is diluted with 60 parts by weight of alcohol, and the green crystals separated are filtered with suction. By treating the same with an oleum of 20% strength the 1.4-di-(4' methylmercapto)anilidoanthraquinone is transformed into a sulfonic acid which is difficultly soluble in water and which dyes wool from an acid bath green shades.

In this sulfonic acid the mercapto group can be transformed into the sulfoxide group by oxidation with hydrogenperoxide in pyridine-water, whereby the dyestuff becomes more readily soluble in water and yields more even shades. In its free state the oxidized dyestuff corresponds probably to the following formula:

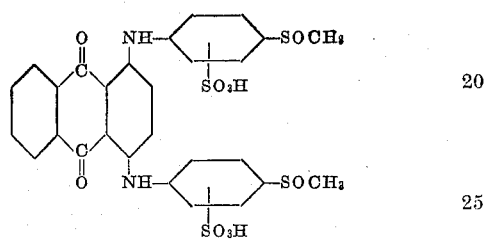

We claim:

1. Anthraquinone compounds of the general formula:

A—(NH—R—SO—alk)$_n$ wherein A stands for a radical of the anthraquinone series, R stands for a radical of the benzene series, alk stands for an alkyl group and $n$ stands for one of the numbers one and two, and wherein at least one sulfonic acid group is present in the molecule, being in form of their alkali metal salts generally crystalline dark metallic lustrous powders, easily soluble in water and dyeing wool from an acid bath generally bluish to greenish shades.

2. Anthraquinone compounds of the general formula:

A—(NH—R—SO—alk)$_n$ wherein A stands for a radical of the anthraquinone series, R stands for a radical of the benzene series, alk stands for methyl or ethyl and $n$ stands for one of the numbers one and two, and wherein at least one sulfonic acid group is present in the molecule, being in form of their alkali metal salts generally crystalline dark metallic lustrous powders, easily soluble in water and dyeing wool from an acid bath generally bluish to greenish shades.

3. The anthraquinone compound of the following formula:

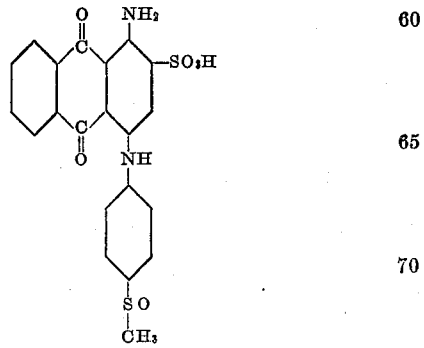

dyeing wool from an acid bath even blue shades.

4. The anthraquinone compound of the following formula:
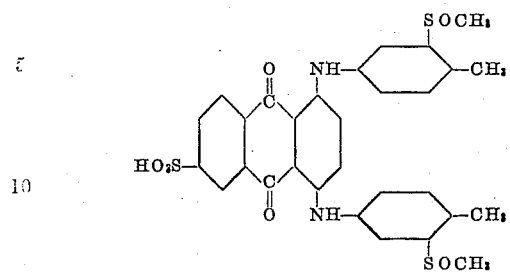
dyeing wool from an acid bath even green shades.
5. The anthraquinone compound of the following formula:
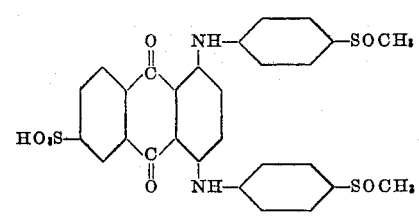
dyeing wool from an acid bath even green shades.
KLAUS WEINAND.
ERNST KALCKBRENNER.